*L. Gore.*
*Sap Spout.*
N°. 64,524. Patented May 7, 1867.
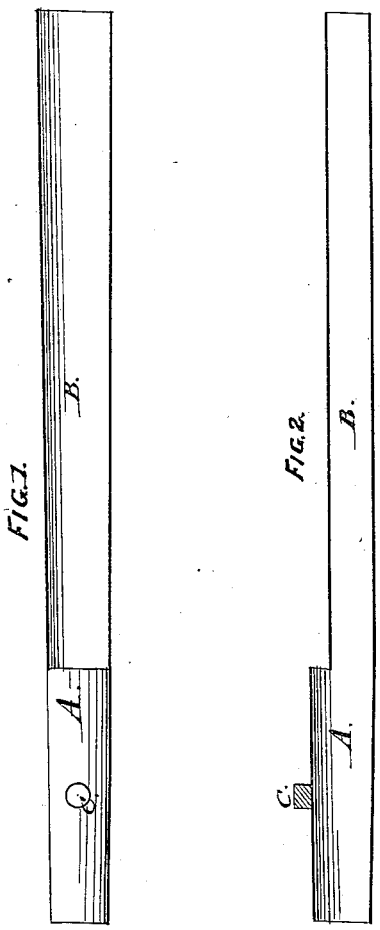
WITNESSES:
W. H. Burridge
Frank Alden
INVENTOR:
Luke Gore

United States Patent Office.

LUKE GORE, OF NEWBURY, OHIO.

Letters Patent No. 64,524, dated May 7, 1867.

---

IMPROVEMENT IN SAP-SPOUTS.

---

The Schedule referred to in these Letters Patent and making part of the same.

---

TO ALL WHOM IT MAY CONCERN:

Be it known that I, LUKE GORE, of Newbury, in the county of Geauga, and State of Ohio, have invented certain new and useful Improvements in Sap-Spouts; and I do hereby declare that the following is a full and complete description of the same, reference being had to the accompanying drawings, making a part of this specification, in which—

Figure 1 is a top view of the sap-spout.

Figure 2 is a longitudinal section.

Like letters of reference refer to like parts.

This spout is made of tin, galvanized iron, or any other suitable metal, and of the shape shown in the drawing, in which it will be seen that a section of one end, A, is tubular, and slightly tapering toward the end, whereas the longer section B is straight, and forming an open, trough-like conductor. C is a nib, the use of which will hereafter be shown.

The practical advantages of this spout over others in use are: Spouts in ordinary use are made of wood. It is therefore found necessary to make them quite large in order that they may be of sufficient strength; hence large holes are bored in the trees for their insertion, and thus the trees are much injured by tapping. But the spouts being made of metal, can be much smaller and with equal strength; hence the trees receive less injury by being tapped. On driving the wooden spouts into the trees, they rough up and tear the sides of the hole, and often, by this means, the spout becomes choked or clogged up, preventing a free flowing of the sap, but this metallic spout, being thin and sharp on the end, does not tear the hole, nor in any way injure the tree or obstruct the issue of the sap. The wooden spouts often break by compression on being driven into the tree, and therefore become useless. The metallic spouts cannot be broken in this way; hence they are much more durable, and can be used for many years, whereas the wooden one lasts only one season. By the use of the metallic spout the sap is kept from souring. The wooden spout becomes saturated with sap, and, by the action of the sun, sours, and the fresh sap is more or less injured thereby. This metallic spout can be more firmly inserted in the trees than wooden ones, and, being provided with the nib referred to, the buckets can be hung upon them, and thereby the danger of their being tipped over avoided. The end of the spout inserted in the tree being tubular, it is less affected by frost than it would be if open. The whole spout may be made covered or tubular, if so desired, or the open end cut off, which, for some trees, would make the spout more convenient.

What I claim as my improvement, and desire to secure by Letters Patent, is—

The herein-described sap-spout, when constructed in the manner specified, as a new article of manufacture.

LUKE GORE.

Witnesses:
W. H. BURRIDGE,
FRANK ALDEN.